United States Patent [19]

Wey

[11] Patent Number: 5,403,111

[45] Date of Patent: Apr. 4, 1995

[54] YOKE CLAMP

[75] Inventor: Edward J. Wey, Burlington, Conn.

[73] Assignee: The Torrington Company, Torrington, Conn.

[21] Appl. No.: 88,720

[22] Filed: Jul. 9, 1993

[51] Int. Cl.⁶ .............................................. F16B 7/04
[52] U.S. Cl. ................................ 403/378; 403/383; 403/290; 464/134
[58] Field of Search .................. 403/57, 58, 157, 290, 403/373, 376, 377, 378, 383; 464/134

[56] References Cited

U.S. PATENT DOCUMENTS

| | | | |
|---|---|---|---|
| 1,121,962 | 12/1914 | Williston | 403/378 |
| 2,122,868 | 7/1938 | Morgan | 403/290 |
| 3,867,050 | 2/1975 | Pitner | 464/134 |
| 5,106,224 | 4/1992 | van Gelderen | 403/383 |
| 5,253,949 | 10/1993 | Oxley et al. | 403/378 |
| 5,358,350 | 10/1994 | Oertle | 403/290 |

OTHER PUBLICATIONS

The Torrington Company, drawing #42FC021437, May 1993.
The Torrington Company, drawing #42FC020316, Oct. 1991.

*Primary Examiner*—Edward K. Look
*Assistant Examiner*—James A. Larson
*Attorney, Agent, or Firm*—Michael H. Minns

[57] ABSTRACT

A yoke clamp for use with a pinion shaft. The pinion shaft has a pie shaped profile. The clamping bolt of the yoke clamp clamps across the small end of the pie shaped profile of the pinion shaft.

7 Claims, 1 Drawing Sheet

U.S. Patent  Apr. 4, 1995  5,403,111
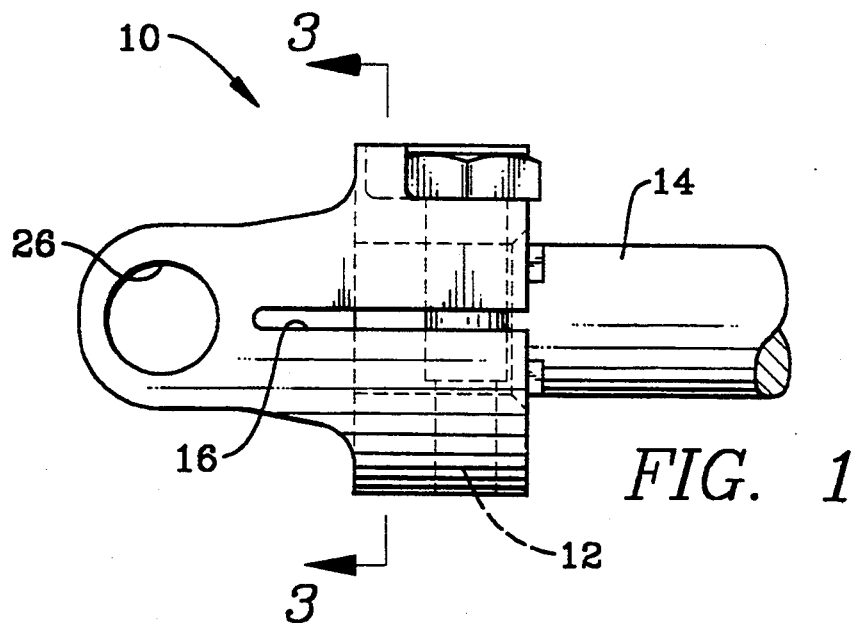
FIG. 1
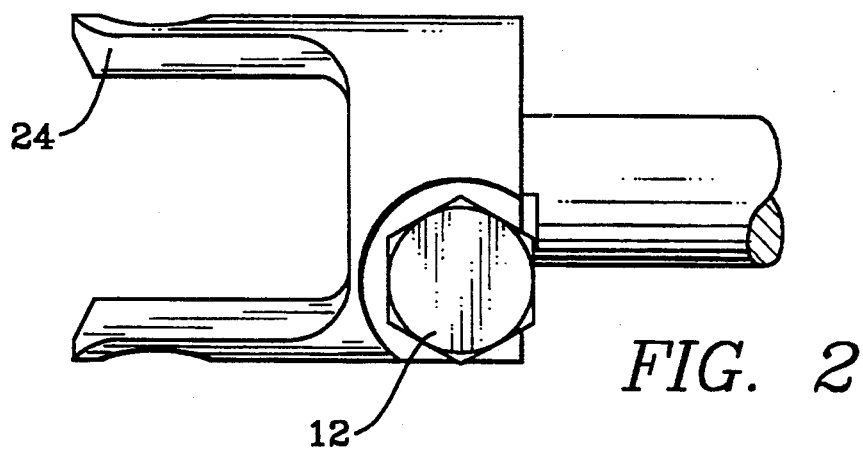
FIG. 2
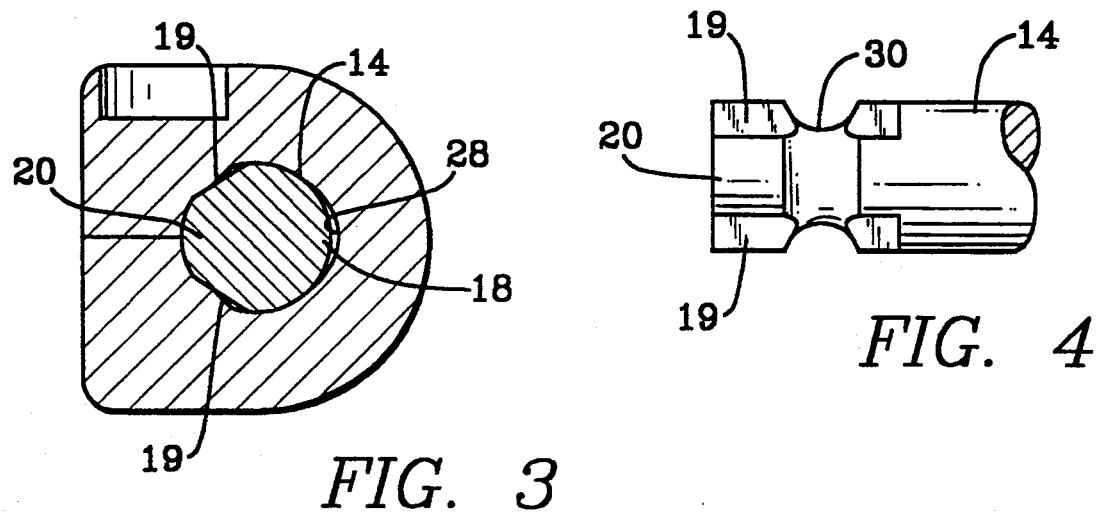
FIG. 3
FIG. 4

YOKE CLAMP

BACKGROUND OF THE INVENTION

This invention relates generally to joints and connectors and more particularly to yoke clamps for use with shafts.

Yoke clamps have been used with shafts having torque transmitting profiles. In one instance, the shaft profile is two radii connected by non-opposed straight sections. One radius is larger than the other radius. The yoke clamp has an axially extending slot with a clamping bolt extending across the slot. The bolt clamps across the large radius of the shaft profile. In some instances, the yokes loosen up.

The foregoing illustrates limitations known to exist in present yoke clamps. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a shaft, an end of the shaft having a profile, the profile having a first portion and a second portion, the first portion being smaller than the second portion; a yoke clamp having a bore therein, the bore having an axially extending slot; and a bolt, the bolt extending across the yoke clamp bore axially extending slot and clamping the yoke clamp across the first portion of the profile of the shaft.

The foregoing and other aspects will become apparent from the following detailed description of the invention when considered in conjunction with the accompanying drawing Figures.

BRIEF DESCRIPTION OF THE DRAWING FIGURES

FIG. 1 is a top view of a yoke clamp and shaft;

FIG. 2 is a front view of the yoke clamp and shaft shown in FIG. 1;

FIG. 3 is an end view of the yoke clamp and shaft shown in FIG. 1, taken on line 3—3; and FIG. 4 is a side view of the shaft.

DETAILED DESCRIPTION

Shown in the FIGURES is a yoke clamp 10 and a portion of a shaft 14. The yoke clamp 10 is used in steering shaft assemblies to fasten a pinion shaft 14 (or steering gearbox shaft) to a steering intermediate shaft (not shown). A clamping bolt 12 is used to tighten the yoke clamp 10 against the pinion shaft 14.

The pinion shaft 14 has a profile, as shown in FIG. 3. The profile is comprised of two curved sections 18 and 20 connected by two straight sections 19. One curved section 20 has a smaller radius than the other curved section 18. This shape is also known as a "pie" shape. Other shaft profiles may be used, as long as the portion of the profile adjacent to the yoke clamp clamping bolt 12 is smaller (or narrower) than the portion of the profile opposite the clamping bolt 12. A groove or notch 30 is turned into the pinion shaft 14 to provide relief for a clamping bolt 12.

The yoke clamp 10 has a pair of ears 24 on one end with a bearing hole 26 in the end of each ear 24. The yoke clamp 10 has a bore 28 therethrough for receiving the pinion shaft 14. The preferred embodiment of the bore 28 is shown in the FIGURES as having a complementary shape to the pinion shaft 14 profile and being a through bore. An axially extending slot 16 is provided in the yoke clamp 10 to allow the yoke clamp 10 to tighten against the pinion shaft 14.

The clamping bolt 12 extends transversely across the slot 16. The clamping bolt 12 is used to secure the yoke clamp 10 and the pinion shaft 14 together. The clamping bolt 12 is proximate the small radius curved section 20 of the pinion shaft 14 profile.

When the clamping bolt 12 is proximate the small radius curved section 20, the yoke clamp 10 primarily contacts the small radius curved section 20, the straight sections 19 and the areas of the large radius curved section 18 adjacent the straight sections 19. FIG. 3 shows the areas of contact.

Initial testing of this yoke clamp has shown an increase in the force to slip of approximately 200% over prior art yoke clamps.

Having described the invention, what is claimed is:

1. In combination:
   a shaft, an end of the shaft having a profile, the profile having a first curved portion and a second curved portion, the first curved portion radius being smaller than the second curved portion radius;
   a yoke clamp having a bore therein and having an axially extending slot intersecting the bore; and
   a bolt, the bolt transversely extending across the yoke clamp axially extending slot, the bolt being proximate the first portion of the profile of the shaft.

2. The combination according to claim 1, wherein the first portion and the second portion are connected by straight portions.

3. The combination according to claim 1, wherein the first portion and the second portion are connected by non-opposed straight portions.

4. The combination according to claim 1, wherein the shaft has a groove thereabout, the transversely extending bolt engaging the groove.

5. In combination:
   a shaft, an end of the shaft having a profile, the profile being pie shaped, one end of the pie shape being smaller than the other end of the pie shape, the shaft having a groove thereabout;
   a yoke clamp having a bore therein and an axially extending slot intersecting the bore; and
   a bolt, the bolt transversely extending across the yoke clamp axially extending slot, the bolt being proximate the small end of the pie shaped profile of the shaft, the bolt engaging the groove.

6. In combination:
   a shaft, an end of the shaft having a profile, the profile having a first curved portion and a second curved portion, the first curved portion radius being smaller than the second curved portion radius, the first and second curved portions being connected by two straight portions, thereby defining the profile, the parts of the second curved portion connected to the straight portions defining two yoke clamp contact areas;
   a yoke clamp having a bore therein and an axially extending slot intersecting the bore; and
   a bolt, the bolt transversely extending across the yoke clamp axially extending slot, the bolt being proximate the first curved portion of the profile of the shaft, the yoke clamp contacting the first curved portion, the straight portions and the yoke clamp contact areas.

7. The combination according to claim 6, wherein the shaft has a groove thereabout, the transversely extending bolt engaging the groove.

* * * * *